(12) United States Patent
Christensen

(10) Patent No.: US 6,299,671 B1
(45) Date of Patent: Oct. 9, 2001

(54) DEVICE AND PROCESS FOR DEHYDRATION OF WATER ABSORBENT

(75) Inventor: Tor Christensen, Asker (NO)

(73) Assignee: Read Process Engineering A/S, Nesbru (NO)

(*) Notice: Subject to any disclaimer, the term of this patent is extended or adjusted under 35 U.S.C. 154(b) by 0 days.

(21) Appl. No.: 09/486,897
(22) PCT Filed: Sep. 2, 1998
(86) PCT No.: PCT/NO98/00268
§ 371 Date: May 10, 2000
§ 102(e) Date: May 10, 2000
(87) PCT Pub. No.: WO99/11348
PCT Pub. Date: Mar. 11, 1999

(30) Foreign Application Priority Data

Sep. 3, 1997 (NO) .................................................. 974060

(51) Int. Cl.[7] .................................................. B01D 19/00
(52) U.S. Cl. .................. 95/166; 95/167; 95/169; 95/179; 95/188; 95/191; 95/193; 95/207; 95/209; 95/234
(58) Field of Search ................. 95/156, 159, 160, 95/161, 163, 164, 166, 167, 169, 171, 172, 173, 174, 175, 176, 177, 178, 179, 180, 183, 186, 188, 191, 192, 193, 194, 204, 206–209, 227, 231, 228, 258–259, 263, 266, 155, 181, 234, 241, 243

(56) References Cited

U.S. PATENT DOCUMENTS

| | | | |
|---|---|---|---|
| 3,736,725 | * 6/1973 | Alleman et al. | 95/194 |
| 3,837,143 | * 9/1974 | Sutherland et al. | 95/166 |
| 3,975,172 | * 8/1976 | Ranke | 95/161 |
| 4,010,065 | 3/1977 | Alleman . | |
| 4,273,620 | * 6/1981 | Knobel | 95/191 |
| 4,280,867 | * 7/1981 | Hodgson | 95/191 |
| 5,490,873 | * 2/1996 | Behrens et al. | 95/160 |
| 5,520,723 | * 5/1996 | Jones, Jr. | 95/161 |
| 5,536,303 | * 7/1996 | Ebeling | 95/166 |

* cited by examiner

Primary Examiner—Duane Smith
Assistant Examiner—Jason M. Greene
(74) Attorney, Agent, or Firm—Browdy and Neimark

(57) ABSTRACT

There is described a method for regeneration of triethylene glycol (TEG) that has been used as a drying medium to remove water from a fluid such as natural gas, where a drier TEG is recovered at the bottom fraction in a regeneration column (7), where water vapor together with other gases is removed at the top fraction and where the partially dried TEG from the regeneration column (7) optionally is also supplied to a stripping column (9) for further dehydration, where in the optional stripping column (9) and in the still column (7) there is supplied a stripping gas in countercurrent to the TEG stream, where as stripping gas there is mainly used gas which is recovered from the top fraction from the regeneration column (7). There is also described an apparatus for carrying out the method.

18 Claims, 1 Drawing Sheet

DEVICE AND PROCESS FOR DEHYDRATION OF WATER ABSORBENT

CROSS REFERENCE TO RELATED APPLICATION

The present application is the national stage under 35 U.S.C. 371 of PCT/NO98/00268, filed Sep. 2, 1998.

The present invention relates to an apparatus and a method for regeneration of a drying agent, particularly for regeneration of a drying agent used in a method for dehydrating produced natural gas at an oil or gas field.

During gas production at an oil and gas field, gas is produced which contains water vapor that it is desirable to remove prior to the further processing and transport of the gas. A typical dehydrator for such gas consists of a contactor, i.e., a column where the produced gas is introduced in countercurrent to a drying agent such as triethylene glycol (TEG) at low temperature and high pressure. The contactor is a packed column having a large surface where the drying agent, such as TEG, is introduced at the top of the column and trickles down over the column while gas is brought in at the bottom of the column and thus runs in countercurrent. At the bottom of the column, the drying agent plus $H_2O$ plus some of the gas is removed, while the dehydrated gas is taken out at the top of the column.

Traditionally the wet triethylene glycol is conducted to a regenerator which comprises a still, where the damp TEG is introduced at the top of the column while a purer TEG is removed from the bottom of the column, and water and any gas that is present is taken out at the top of the column. From the bottom of the regeneration column the enriched TEG is often fed through a stripping column where a stripping gas is optionally supplied in countercurrent. From the stripping column the purer TEG is often conducted down into a retention vessel, where in a preferred embodiment there is provided a so-called "cold finger", a cooler intended to condense water vapor over the surface of the liquid in the retention vessel in order to recirculate the condensed liquid through the TEG regeneration unit, while the "dry" TEG is removed from the retention vessel and conducted back to the contactor. To improve the effect of the extra dehydration by means of the "cold finger", there is also introduced to the retention vessel what is called a "blanket gas" or stripping gas to reduce the partial pressure of the water vapor. This "blanket gas" is then also conducted on to the stripping column and optionally also the regeneration column to function as a stripping gas in addition to equalizing the pressure in the system. This gas is a fuel gas which is burned off after use.

This traditional TEG regeneration, however, yields a TEG which could advantageously be dried more thoroughly in order to produce more effective dehydration in the contactor, in addition to the fact that the supplying of stripping gas, which is often a purified hydrocarbon gas, is an environmental problem that must be taken care of, normally by burning, a situation which in turn gives the basis for payment of a $CO_2$ fee. The wet TEG that is removed from the contactor contains approximately 96% by weight of TEG, whereas the regenerated TEG from this traditional dehydration is about 99.0–99.5% pure. A seemingly minor increase (e.g., 0.1% by weight) of the purity (reduced water quantity) would thus produce a considerable increase in the capacity of the dehydrated TEG to take up water, thus enabling a reduction of the recirculation rate.

The goal of the present invention is thus to reduce the amount of water in the regenerated TEG at the same time as the supplying of an extra stripping gas can be avoided.

This is solved according to the present invention by a method for regeneration of triethylene glycol (TEG) that has been used as a drying medium to remove water from a fluid such as natural gas, where a drier TEG is recovered as the bottom fraction in a regeneration column, where water vapor together with other gases is removed as the top fraction and where the partially dried TEG from the regeneration column optionally is also supplied to a stripping column for further dehydration where, in the optional stripping column and in the still column, there is supplied a stripping gas in countercurrent to the TEG stream, where as stripping gas there is mainly used gas which is recovered from the top fraction from the regeneration column.

According to the present invention there is also provided an apparatus for regeneration of triethylene glycol (TEG) that has been used as a drying medium to remove water from a fluid such as natural gas, where the wet TEG is fed into the top of a regeneration column where a drier TEG is recovered as the bottom fraction, where water vapor and other gases are taken out as a top fraction and where to the regeneration column there is optionally connected a stripping column for further dehydration of the partially dried TEG from the regeneration column, where to the optional stripping column and to the still there is supplied a stripping gas in countercurrent to the TEG stream, where a cooler is provided for cooling down the top fraction from the regeneration column to a temperature where water vapor is condensed and may be separated from the rest of the top fraction.

Closer examinations of the wet TEG from the contactor have shown that this mixture contains of the order of 3 mole–% $C_1$ –$C_5$ hydrocarbons and 1.5 mole–% $CO_2$, together with about 22 mole–% water.

According to the present invention, the quantity of gas contained in the drying agent is utilized as a stripping gas by recirculating and feeding it back to the TEG regeneration unit as stripping gas. This produces substantial savings in that one avoids having to use fuel gas as a stripping agent, in addition to the fact that it is possible to reduce severely the quantity of gas that is released and must be burned.

BRIEF DESCRIPTION OF THE DRAWING

The present invention will now be described in more detail, with reference to the attached FIG. 1, which shows an outline of the principle of a preferred regeneration unit for TEG according to the present invention.

Dehydration of the gas takes place in a known manner in a contactor where the gas to be dried is conducted into the bottom of the contactor and flows upwards, and dehydrated gas is taken out at the top and sent further for export.

Figure 1:
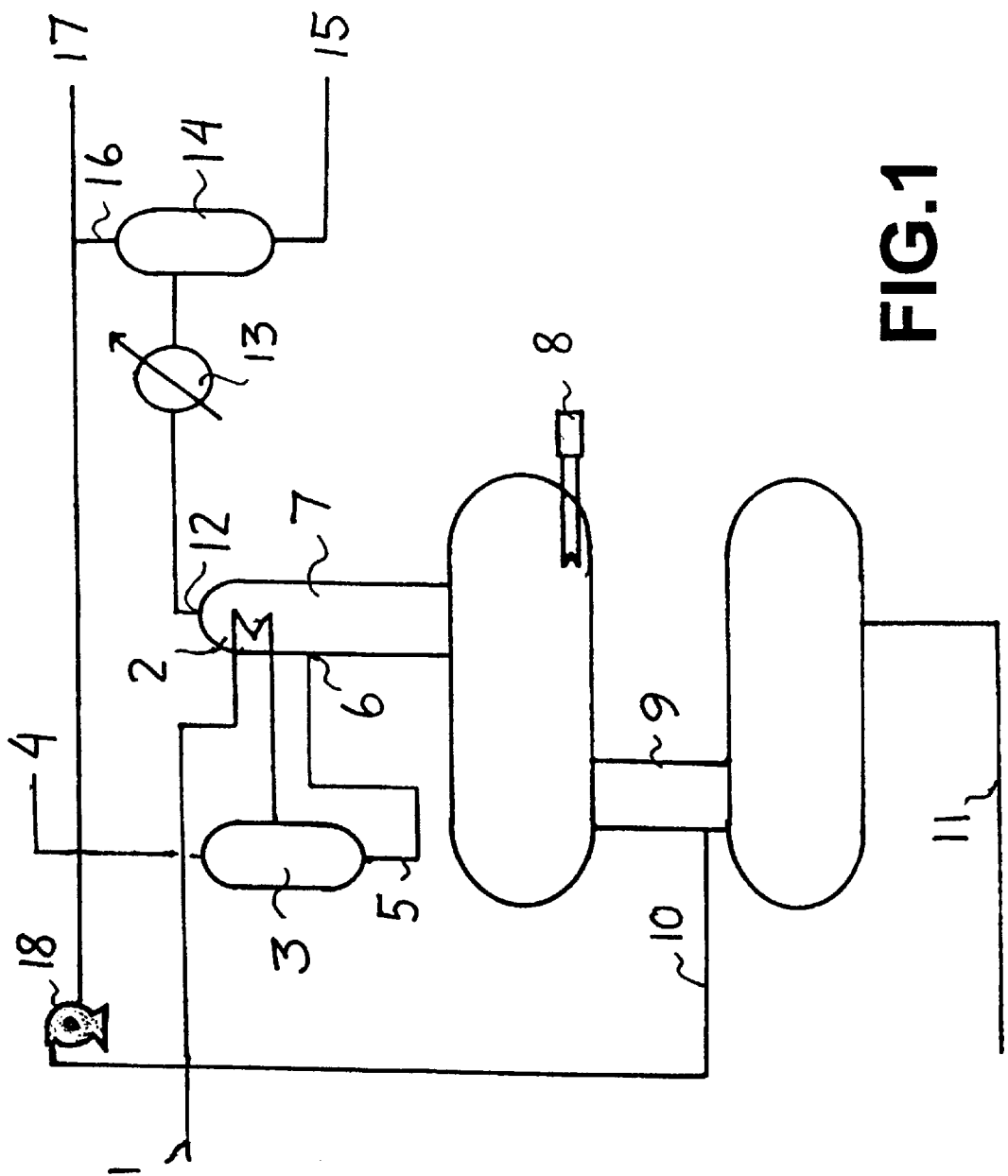

The drying agent, here TEG, is conducted into the top of the contactor and flows downward therein, and hydrated (wet) drying agent is removed at the bottom of the contactor and conducted to the present regeneration unit for drying or dehydration.

The wet TEG is conducted from the contactor in a TEG regeneration line 1 to the regeneration unit. Normally the pressure of the drying agent will be relieved in a reduction valve, not shown, before the drying agent is heated in one or more heat exchanger(s) 2.

Following heating, the pressure of the drying agent is relieved again in a blowdown tank 3, where some gas is freed and released through outlet 4, where the gas is sent to export, to burning, or another use. The liquid phase in the blowdown tank 3 is released through line 5 before being conducted to inlet 6, which is located high up in a regeneration column 7, which is a still column where the fraction having the highest boiling point, namely TEG, runs down and is collected at the bottom of the column, while fractions having a lower boiling point such as gas and water vapor rise upwards in the column and are removed at the top of the column. A heating device 8 at the bottom of regeneration column 7 heats up the contents of the column.

From regeneration column 7 the partially dehydrated TEG is conducted from the bottom of the regeneration column further on to an inlet near the top of a stripping column 9. Into stipping column 9 is introduced stripping gas, which is acquired from the regeneration process explained below, near the bottom of the stripping column from a stripping gas line 10.

TEG, which runs in countercurrent to the stripping gas in stripping column 9, is dehydrated further and is conducted out through an outlet near the bottom of the stripping column to TEG line 11. The stripping gas from the stripping column runs from the top of the stripping column over to regeneration column 7 where it rises to the top thereof together with water vapor and the gas that was brought with the drying agent from the gas dehydration.

Gas and water vapor are conducted from the top of regeneration column 7 through heat exchanger 2, where the gas and water vapor are cooled and the wet TEG is heated as described above. Water and gas that run out through an outlet 12 at the top of regeneration column 7 are cooled further in heat exchanger 13 before being conducted to a blowdown tank 14 where the water is condensed together with any oil and TEG that was carried with it. The liquid phase in blowdown tank 14 is conducted out through a water outlet 15 at the bottom of the tank, while the gas is removed through gas line 16. The gas in gas line 16 is split, so that excess gas is conducted in line 17 to a burning process, while the main stream of gas is conducted to a fan/pump 18 where it is compressed and returned to stripping column 9 as stripping gas. When starting up the process, and if regeneration of the stripping gas should fail, a container for stripping gas may optionally be connected to stripping gas line 10. During normal operation, however, the recirculated stripping gas will be constantly supplemented with gas which follows along with the drying agent from the drying process, so that it is this surplus which must eventually be taken care of by, for example, burning.

TEG which is lost in the drying and regeneration process must be replaced by the supplying of TEG to the stream of dehydrated TEG via a TEG-supply, not shown.

After stripping column 9 there may also optionally be provided a retention vessel, not shown, for a 30-minute use of TEG, for example, as a buffer in the system. The now heated TEG is then conducted via TEG line 11 through one or more heat exchangers for TEG and one or more pumps so that the drying agent is cooled down to the temperature and compressed to the pressure that is desirable in the contactor.

In a typical contactor, which is a packed column having a large surface, there is a pressure of about 70 bar and a temperature of about 30° C. during normal operations. This provides a sufficient gas dehydration for a quantity of gas of the order of 12,000 m$^3$/hour, or about 9.3×10$^5$ kg/hour. To dry this gas there are used approximately 20 tons of TEG per hour. This assumes, however, that the TEG is sufficiently dry, for example 99.5 to 99.9 TEG.

The wet TEG contains about 96% TEG, and is supplied to the TEG regeneration column 7, where the temperature is normally about 150° C. In heat exchanger 6 the gas that runs out at the top of regeneration column 7 is cooled down to, preferably, about 100° C., while the gas is cooled down further to about 20–50° C., e.g., 30° C., in cooler 13 before water and gas are separated in blowdown tank 14.

Heating device 8 heats the TEG in the regeneration column, preferably to a temperature of about 200° C. TEG is also conducted further to stripping column 9 at a temperature of about 200° C. The temperature of 200° C. is important, since TEG is degenerated at temperatures above 204° C. at normal pressure.

In this apparatus some TEG will normally follow along with the water and be carried out together with the water in water outlet 15. Such a TEG loss can be, for example, of the order of 5–6 kg/hour, and a corresponding amount of TEG must be supplied through the TEG inlet, not shown. The quantity of gas that is carried with TEG and water to regeneration column 7, and that is recirculated in the system through gas line 14, is of the order of 150 kg/hour, a gas quantity that will also contain a smaller, but undesired, amount of water vapor.

The present regeneration unit for TEG can differ in its details from the unit as shown on the figure without departing from the spirit and the main principles of the invention. For example, stripping column 9 and regeneration column 7 may be combined into one column, but then there must be used a considerably larger amount of circulating stripping gas in order to produce the same purity of regenerated TEG. It has been calculated, however, that with this type of solution, about five times as much stripping gas must be supplied to this combined column as to the system with two different columns. A system as shown on the present figure will be favorable with regard to economical energy use, since here heat exchangers are used where the liquid or gas that is to be cooled is utilized to supply heat to the liquid or gas, respectively, that is to be heated.

The central point here, however, is that unlike what is common for such systems, one does not supply a purified, dehydrated and expensive gas as stripping gas, a gas which thereafter must be disposed of, usually by burning. The solution is thus economically very favorable in that it is not necessary to purchase expensive stripping gas and, in addition, there are generated lower amounts of non-exportable gas that must be burned, than is the case with a traditional installation.

What is claimed is:

1. A method for regeneration of wet triethylene glycol (TEG) that has been used as a drying medium to remove water from fluid, where a drier TEG is recovered as the bottom fraction in a regeneration column (7), where water vapor together with other gases is removed as the top fraction, and where the partially dried TEG from the regeneration column (7) optionally is also supplied to a stripping column (9) for further dehydration where in the optional stripping column (9) and in the regeneration column (7) a stripping gas is supplied countercurrent to the TEG stream, characterized in that as stripping gas there is mainly used gas which is recovered from the top fraction from the regeneration column (7).

2. The method according to claim 1, characterized in that gas for use as stripping gas is recovered from the top fraction from the regeneration column (7) by cooling of the top fraction such that water vapor is condensed and separated from the gas.

3. The method according to claim 2, characterized in that the top fraction is cooled to 20–50° C., for condensation of water vapor.

4. The method according to claim 1, characterized in that the gas that is used as stripping gas is gas that is carried from the fluid that is dried with the wet TEG into the regeneration process for TEG.

5. An apparatus for regeneration of wet triethylene glycol (TEG) that has been used as a drying medium to remove water from fluid, where the wet TEG is introduced into the top of a regeneration column (7) where a drier TEG is recovered as the bottom fraction, where water vapor together with other gases is removed as the top fraction and where to the regeneration column (7) there is optionally connected a stripping column (9) for further dehydration of the partially dried TEG from the regeneration column (7), where to the optional stripping column (9) and the regeneration column (7) there is supplied a stripping gas in countercurrent to the TEG stream, characterized in that a cooler (13) is provided for cooling down the top fraction from the regeneration column (7) to a temperature where water vapor is condensed and can be separated from the remaining top fraction, and in that said apparatus further comprises means for feeding the top fraction from the regeneration column (7) as stripping gas.

6. The apparatus according to claim 5, characterized in that after the cooler (13) there is provided a blowdown tank (14) for separation of condensed water and gas.

7. The apparatus of claim 5 wherein said strippping columm (9) is present.

8. The apparatus according to claim 7, characterized in that after the cooler (13) there is provided a blowdown tank (14) for separation of condensed water and gas.

9. The apparatus of claim 8, further comprising a line (16) extending from said blowdown tank (14) through a line to a compressor for compression and returning through a line (10) to said stripping column (9).

10. The method of claim 2, wherein said top fraction is cooled to about 30° C. for condensation of water vapor.

11. The method of claim 2 wherein said stripping gas is gas that is carried from the fluid and is dried with the partially dried TEG into the regeneration process for TEG.

12. The method of claim 3 wherein said stripping gas is gas that is carried from the fluid and is dried with the partially dried TEG into the regeneration process for TEG.

13. The method of claim 1 wherein said fluid is natural gas.

14. The method according to claim 13, characterized in that gas for use as stripping gas is recovered from the top fraction from the regeneration column (7) by cooling of the top fraction such that water vapor is condensed and separated from the gas.

15. The method according to claim 14, characterized in that the top fraction is cooled to 20–50° C., for condensation of water vapor.

16. The method of claim 13 wherein said stripping gas is gas that is carried from the fluid and is dried with the partially dried TEG into the regeneration process for TEG.

17. The method of claim 14 wherein said stripping gas is gas that is carried from the fluid and is dried with the partially dried TEG into the regeneration process for TEG.

18. The method of claim 15 wherein said stripping gas is gas that is carried from the fluid and is dried with the partially dried TEG into the regeneration process for TEG.

* * * * *